United States Patent
Lin et al.

(10) Patent No.: US 8,073,418 B2
(45) Date of Patent: Dec. 6, 2011

(54) RECEIVING SYSTEMS AND METHODS FOR AUDIO PROCESSING

(75) Inventors: Chien-Hung Lin, Kaohsiung (TW); Hsing-Ju Wei, Keelung (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 793 days.

(21) Appl. No.: 12/185,778

(22) Filed: Aug. 4, 2008

(65) Prior Publication Data

US 2010/0029240 A1 Feb. 4, 2010

(51) Int. Cl.
*H04B 1/10* (2006.01)
*H04B 5/455* (2006.01)

(52) U.S. Cl. .................. 455/312; 455/337; 348/726

(58) Field of Classification Search .................. 455/293, 455/309, 312, 225, 226.1, 337, 334; 348/706, 348/725, 726

See application file for complete search history.

(56) References Cited

U.S. PATENT DOCUMENTS

| | | | | | |
|---|---|---|---|---|---|
| 4,414,571 | A | * | 11/1983 | Kureha et al. | 348/554 |
| 5,012,516 | A | * | 4/1991 | Walton et al. | 381/3 |
| 5,418,815 | A | * | 5/1995 | Ishikawa et al. | 375/216 |
| 6,714,259 | B2 | * | 3/2004 | Kim | 348/706 |
| 7,436,914 | B2 | * | 10/2008 | Lin | 375/347 |
| 2009/0262246 | A1 | * | 10/2009 | Tsai et al. | 348/604 |

* cited by examiner

*Primary Examiner* — Sonny Trinh
(74) *Attorney, Agent, or Firm* — Winston Hsu; Scott Margo

(57) ABSTRACT

A receiving system for audio processing includes a first demodulation unit and a second demodulation unit. The first demodulation unit is utilized for receiving an audio signal and generating a first demodulated audio signal. The second demodulation unit is utilized for selectively receiving the audio signal or the first demodulated audio signal according to a setting of a television audio system which the receiving system is applied, and generating a second demodulated audio signal.

12 Claims, 5 Drawing Sheets

RECEIVING SYSTEMS AND METHODS FOR AUDIO PROCESSING

BACKGROUND

The invention relates to receiving systems and methods for TV audio processing, and more particularly, to a receiving system complying with multiple audio standards and related method thereof. Audio stereo signal standards for TV broadcasts include Zweikanalton, also known as German Stereo or A2 Stereo, Near Instantaneous Companded Audio Multiplex (NICAM), and Multichannel Television Sound (MTS), which is also known at the BTSC standard. Standards such as Zweikanalton and NICAM rely on two separate FM carriers. The second FM carrier of Zweikanalton, for example, is transmitted on a frequency 242 kHz higher than the main FM carrier. It can carry either a completely separate audio program, or be used for stereo sound transmission. In the latter case, the first FM carrier carries L+R for compatibility, while the second carrier carries 2*R. The second carrier also contains a control tone to indicate whether the transmission is stereo or dual sound. Absence of this tone is interpreted as a monaural transmission. A receiver capable of receiving and processing signals of such two-carrier system has two sets of audio signal processing hardware for processing signals carried by the two carrier concurrently.

The MTS signal is transmitted at a designated carrier frequency as part of the composite broadcast television video. The MTS signal comprises two or more channels, a first channel, which is the main channel formed as the sum of the left and right audio signals, and can be detected by both monophonic TV receivers and stereo receivers. A second channel is formed as the difference between the left and right audio signals, and is detectable only by stereo receivers. A SAP channel is used to provide a Supplemental Audio Program (SAP) such as a second language, for example Chinese.

The MTS receiver performs two steps of demodulation, first FM (frequency modulation) demodulation, follows by AM (amplitude modulation) demodulation for stereo audio input, or FM demodulation for dual audio input. For example, an FM demodulator circuit demodulates a stereo signal and removes the FM carrier to output a composite audio signal. The composite audio signal is then coupled to a signal processing circuit that separates the various audio channels with AM demodulation. Corresponding audio signals L and R can thus be output for reproduction by the television speakers.

Vendors can hold the edge over their rivals if a solution complying with different audio standards is provided. An instinct way to satisfy different TV audio standards, say MTS and Zweikanalton, is to equip receivers with parallel audio signal processing hardware. When receiving audio channels from a Zweikanalton system, the receiver demodulates signals carried by two carriers with two audio signal processing hardware concurrently, and when receiving audio channels from a MTS system, only one signal processing hardware is occupied.

Please refer to the receiving system illustrated in FIG. 1, which is capable of receiving audio channels from a Zweikanalton system or a MTS system. The two sets of audio signal processing hardware of the receiving system in FIG. 1 operate to process audio signals carried by two carriers concurrently if it is working with the NICAM system. One of the signal processing hardware is unused if the receiving system is working with the MTS system.

SUMMARY

According to one embodiment of the present invention, a receiving system for audio processing includes a first demodulation unit and a second demodulation unit. The first demodulation unit is utilized for receiving a modulated audio signal and generating a first demodulated audio signal. The second demodulation unit is utilized for selectively receiving the modulated audio signal or the first demodulated audio signal according to a setting of a television audio system which the receiving system is applied, and generating a second demodulated audio signal.

According to another embodiment of the present invention, a receiving method for audio processing comprises: receiving an audio signal and generating a first demodulated audio signal; and selectively receiving the audio signal or the first demodulated audio signal according to a setting of a television audio system, and generating a second demodulated audio signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
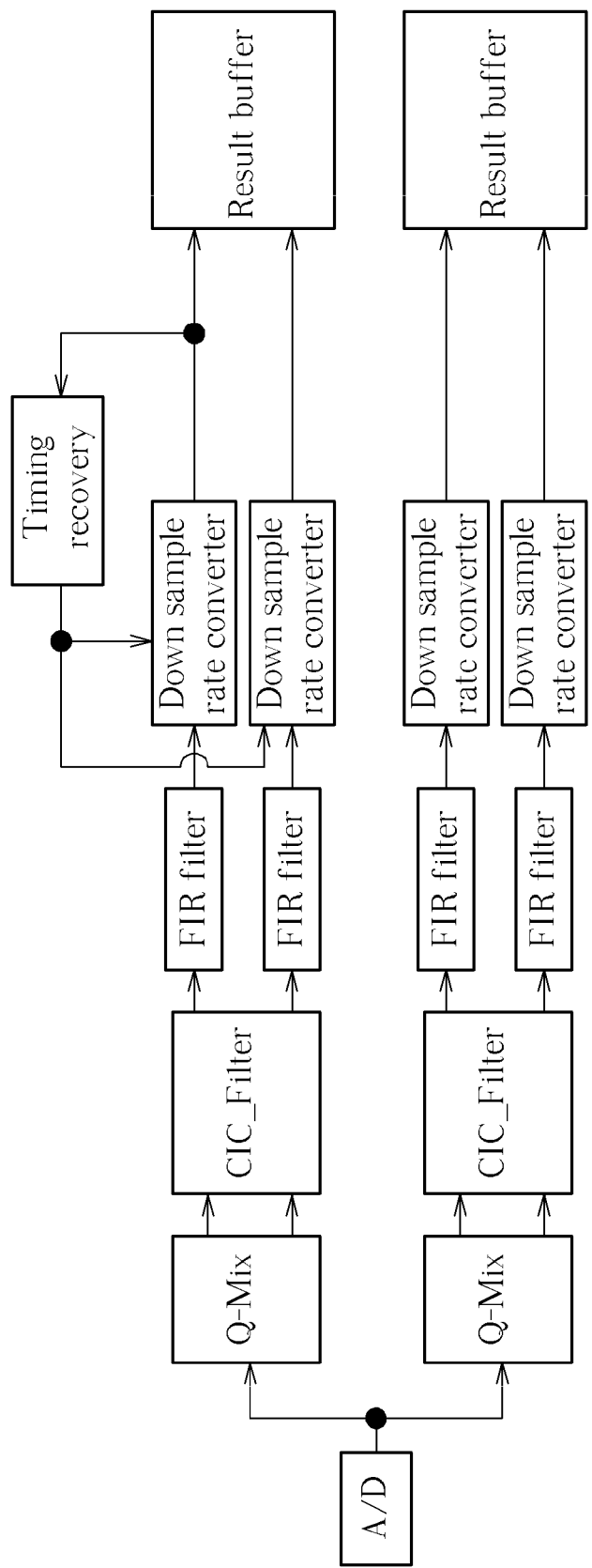
FIG. 1 is a related art receiving system capable of receiving audio channels from a Zweikanalton system and a MTS system.
Figure 2:
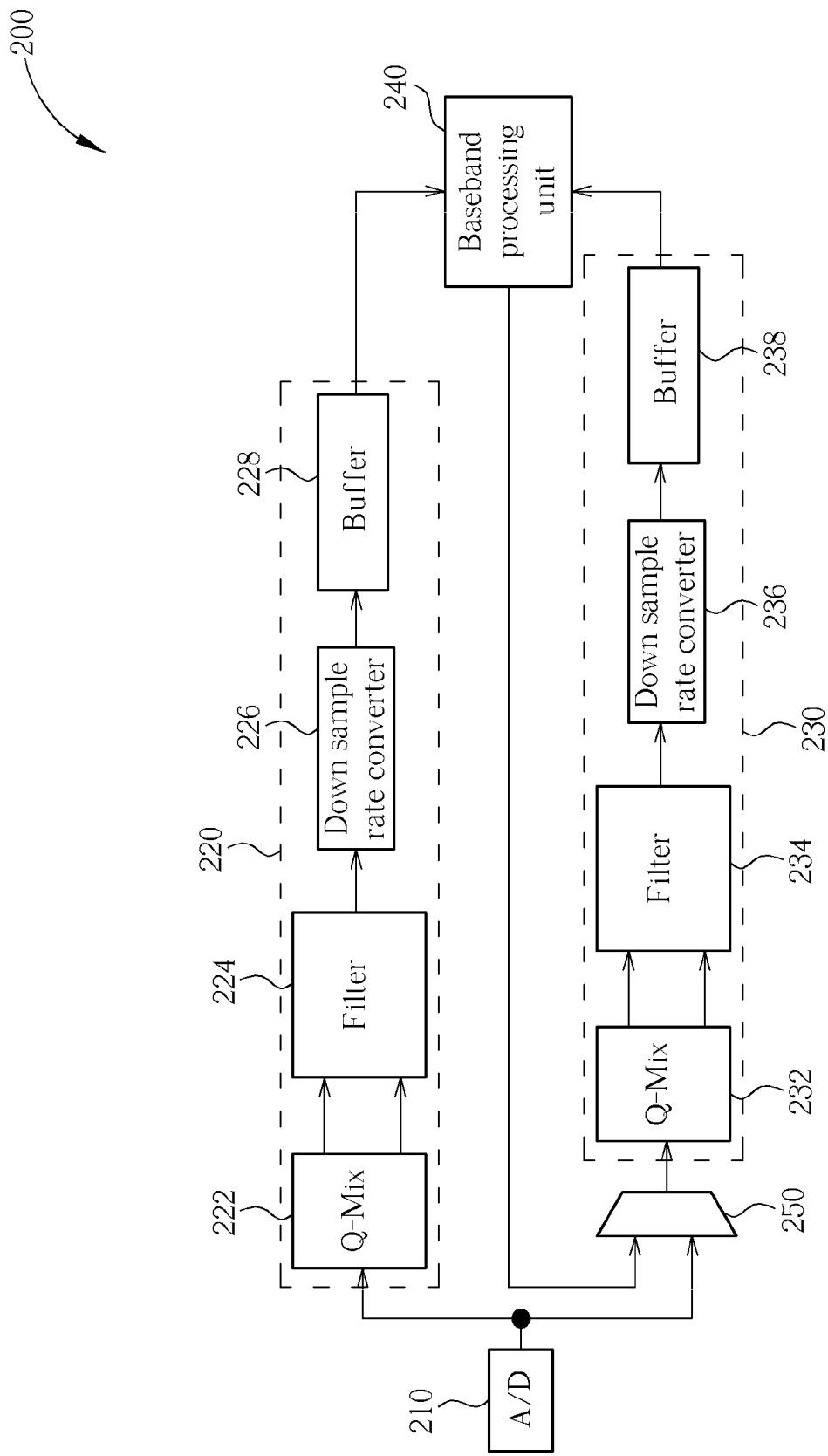
FIG. 2 is a diagram illustrating a receiving system capable of receiving audio channels from the Zweikanalton system and the MTS system according to a first embodiment of the present invention.

FIG. 2 is a diagram illustrating a receiving system 200 capable of receiving audio channels from the Zweikanalton system and the MTS system according to a first embodiment of the present invention. As shown in FIG. 2, the receiving system 200 includes an analog-to-digital converter 210, a first demodulation unit 220, a second demodulation unit 230, a base-band processing unit 240, and a multiplexer 250. The first demodulation unit 220 includes a quadrature mix 222, a filter 224, a down sample rate converter 226, and a buffer 228.

The second demodulation unit 230 includes a quadrature mix 232, a filter 234, a down sample rate converter 236, and a buffer 238.

When the receiving system 200 is set to receive audio signals from the Zweikanalton system, the audio signal generated from the analog-to-digital converter 210 is inputted into the first and second demodulation units 220 and 230, and the first and second demodulation units 220 and 230 respectively demodulate audio signals carried by two carriers concurrently. On the other hand, when the receiving system 200 is set to receive audio signals from the MTS system, the audio signal from the analog-to-digital converter 210 is only inputted into the first demodulation unit 220 to be performed FM demodulation. The first demodulation unit 220 demodulates the audio signal and removes the FM carrier to output a FM-demodulated or a partially demodulated audio signal. Then, the FM-demodulated or the partially demodulated audio signal is inputted into the base-band processing unit 240 and the second demodulation unit 230. The second demodulation unit 230 performs AM demodulation on the FM-demodulated audio signal to output an AM-demodulated audio signal. Finally, the base-band processing unit 240 synchronizes the FM-demodulated audio signal and the AM-demodulated audio signal, and output these two demodulated audio signals for further operations.

In the detail operations of the first demodulation unit 220, the audio signal is performed quadrature mixing operation by the quadrature mix 222, and then being filtered out frequency component at double carrier frequency by the filter 224. After that, the down sample rate converter 226 converts a sample rate of a filtered audio signal from the filter 224. Then a converted audio signal from the down sample rate converter 226 is stored into the buffer 228. Additionally, the operations of the quadrature mix 232, the filter 234, the down sample rate converter 236 and the buffer 238 in the second demodulation unit 230 are respectively the same as corresponding components in the first demodulation unit 220. Therefore, further description is omitted here.

It is noted that, in the above description, the first and second demodulation units 220 and 230 respectively perform FM demodulation and AM demodulation. However, when the audio signal in the MTS system is modulated by two FM modulations, the second demodulation unit 230 performs another FM demodulation on the FM-demodulated audio signal generated from the first demodulation unit 220.

In addition, the base-band processing unit 240 can be implemented by hardware, software, or the combination. Besides, in the receiving system 200, the base-band processing unit 240, the down sample rate converters 226 and 236, and the buffers 228 and 238 are optional devices. That is, in other embodiments of the present invention, the receiving system can function well without these optional devices.

Figure 3:
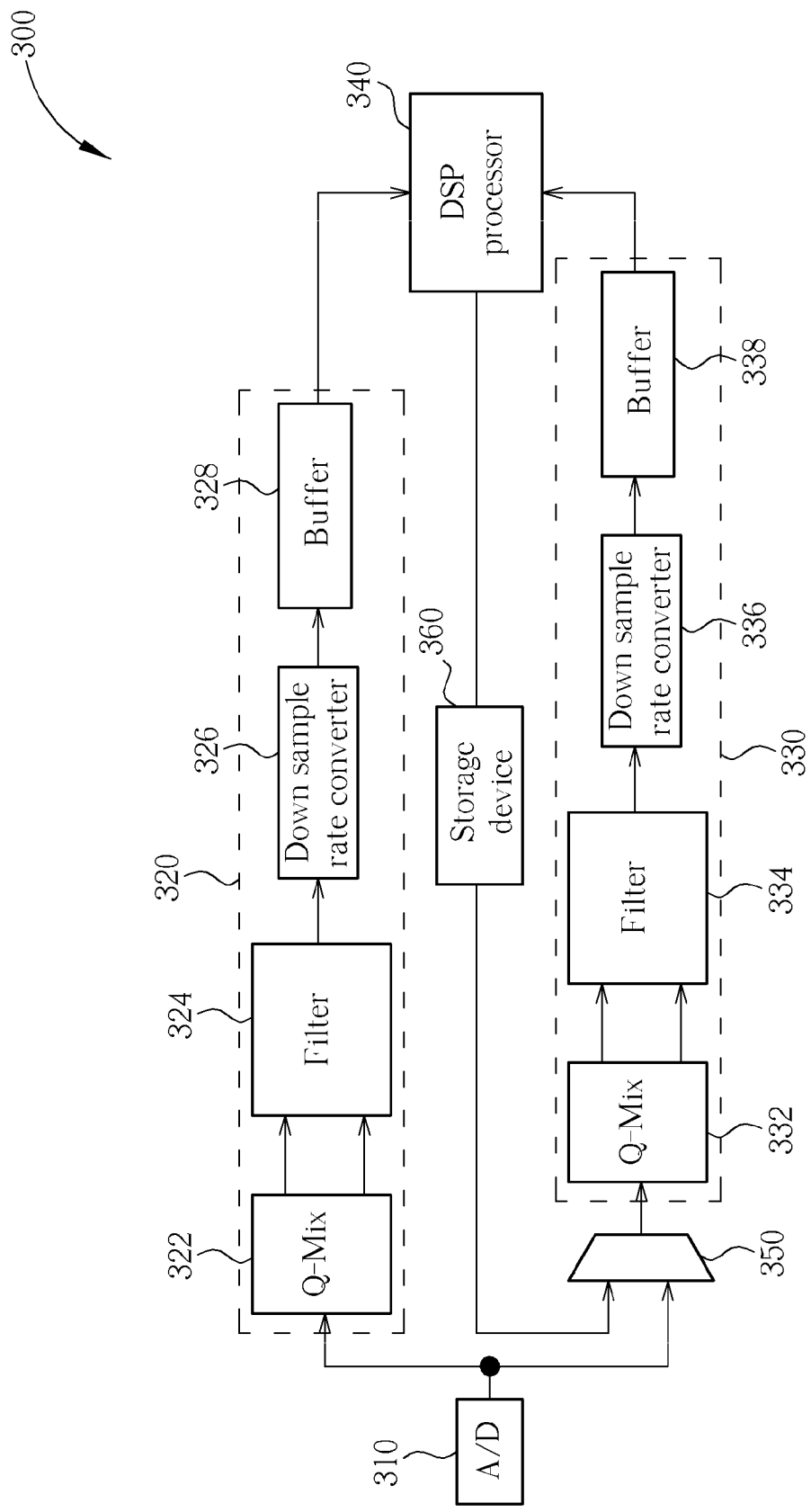
FIG. 3 is a diagram illustrating a receiving system capable of receiving audio channels from the Zweikanalton system and the MTS system according to a second embodiment of the present invention.

FIG. 3 is a diagram illustrating a receiving system 300 capable of receiving audio channels from the Zweikanalton system and the MTS system according to a second embodiment of the present invention. As shown in FIG. 3, the receiving system 300 includes an analog-to-digital converter 310, a first demodulation unit 320, a second demodulation unit 330, a DSP (digital signal processing) processor 340, a multiplexer 350, and a storage device 360. The first demodulation unit 320 includes a quadrature mix 322, a filter 324, a down sample rate converter 326, and a buffer 328. The second demodulation unit 330 includes a quadrature mix 332, a filter 334, a down sample rate converter 336, and a buffer 338.

When the receiving system 300 is set to receive audio channels from the Zweikanalton system, the audio signal generated from the analog-to-digital converter 310 is inputted into the first and second demodulation units 320 and 330, and the first and second demodulation units 320 and 330 respectively demodulate audio signals carried by two carriers concurrently. On the other hand, when the receiving system 300 is set to receive audio channels from the MTS system, the audio signal from the analog-to-digital converter 310 is only inputted into the first demodulation unit 320 to be performed FM demodulation. The first demodulation unit 320 performs FM demodulation on the audio signal to output a FM-demodulated or a partially demodulated audio signal. Then the FM-demodulated or the partially demodulated audio signal is processed by the DSP processor 340, and a processed audio signal from the DSP processor 340 is stored into the storage device 360. After that, the processed audio signal is inputted into the second demodulation unit 330 to be performed AM demodulation or another FM demodulation, and the second demodulation unit 330 outputs an AM-demodulated audio signal (or another FM-demodulated signal) to the DSP processor 340. Finally, the DSP processor 340 synchronizes the FM-demodulated audio signal and the AM-demodulated audio signal, and output these two demodulated audio signals for further operations. In addition, the detailed operations in the first and second demodulation unit 320 and 330 are respectively the same as the first and second demodulation unit 220 and 230 shown in FIG. 2. Therefore, further descriptions are omitted here.

It is noted that, in the receiving system 300, the storage device 360 is an optional device. That is, the storage device 360 can be removed without influencing the functions of the receiving system 300. Besides, the buffer 328 or the buffer 338 can be served as the storage device 360, for storing the processed audio signal from the DSP processor 340.

It is noted that, in the receiving system 300, the down sample rate converters 326 and 336, and the buffers 328 and 338 are optional devices. That is, in other embodiments of the present invention, the receiving system 300 can function well without these optional devices.

Figure 4:
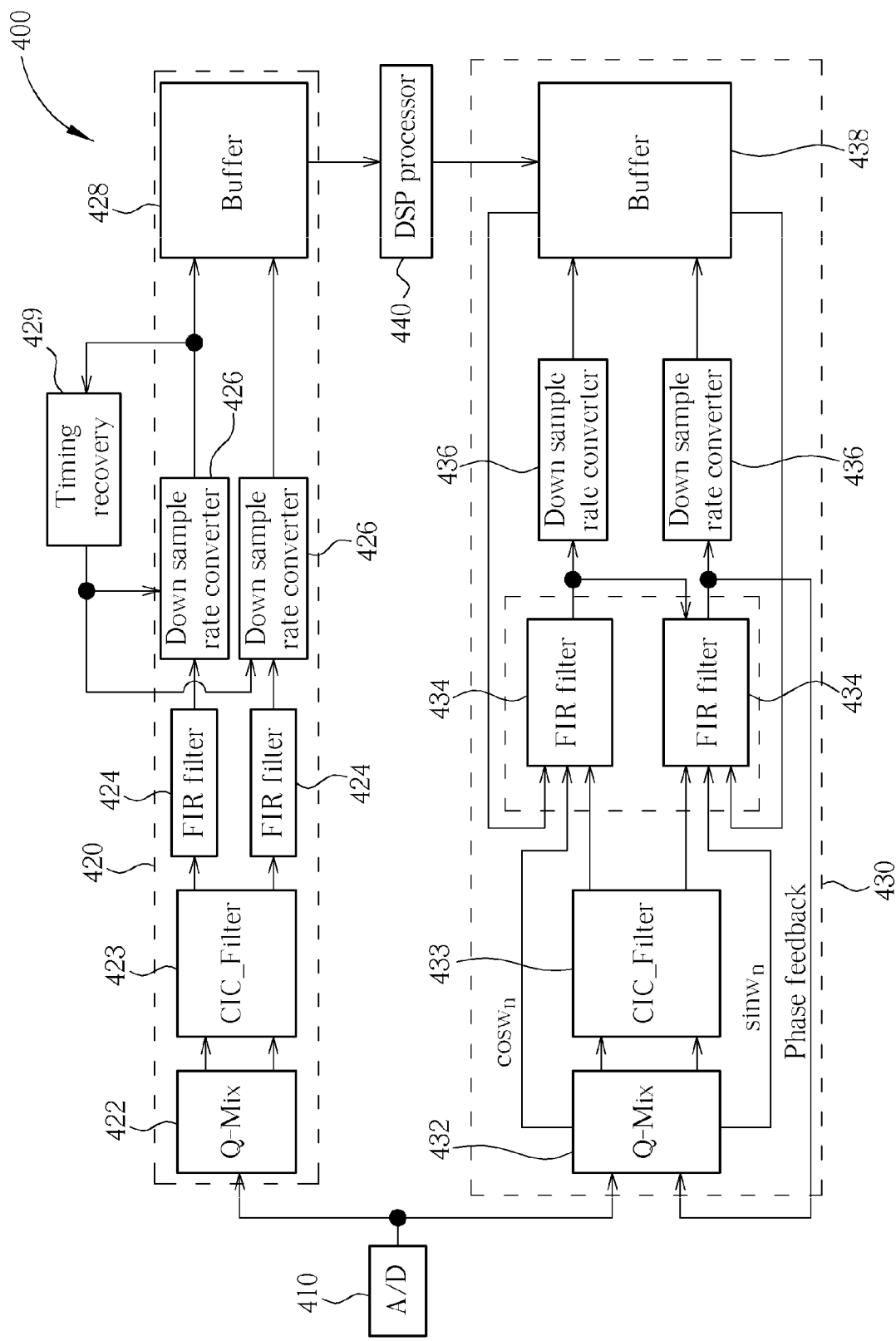
FIG. 4 is a diagram illustrating a receiving system capable of receiving audio channels from the Zweikanalton system and the MTS system according to a third embodiment of the present invention.

FIG. 4 is a diagram illustrating a receiving system 400 capable of receiving audio channels from the Zweikanalton system and the MTS system according to a third embodiment of the present invention. As shown in FIG. 4, the receiving system 400 includes an analog-to-digital converter 410, a first demodulation unit 420, a second demodulation unit 430, a timing recovery 429, and a DSP processor 440. The first demodulation unit 420 includes a quadrature mix 422, a CIC (cascaded integrator-comb) filter 423, two FIR (finite impulse response) filters 424, two down sample rate converters 426, and a buffer 428. The second demodulation unit 430 includes a quadrature mix 432, a CIC filter 433, two FIR filters 434, two down sample rate converter 436, and a buffer 438.

When the receiving system 400 is set to receive audio channels from the Zweikanalton system, the audio signal generated from the analog-to-digital converter 410 is inputted into the first and second demodulation units 420 and 430, and the first and second demodulation units 420 and 430 respectively demodulate audio signals carried by two carriers concurrently. On the other hand, when the receiving system 400 is set to receive audio channels from the MTS system, the audio signal from the analog-to-digital converter 410 is only inputted into the first demodulation unit 420 to be performed FM demodulation. The first demodulation unit 420 performs FM demodulation on the audio signal to output a FM-demodulated or partially demodulated audio signal. Then the FM-demodulated or partially demodulated audio signal is processed by the DSP processor 440, and a processed audio signal from the DSP processor 440 is stored into the buffer 438. After that, the processed audio signal is inputted into the FIR filters 434 to filter out frequency components at double carrier frequency and to be performed AM demodulation or another FM demodulation. Additionally, the operations of the second demodulation unit 430 is similar to the operations of the second demodulation unit 330 shown in FIG. 3, therefore, the operations of the quadrature mix 432, the CIC filter 433 and the down sample rate converters 436 are omitted here. Besides, in the receiving system 400, the FIR filters 434 generate a phase error feedback to the quadrature mix 432 for phase correction, that is, phases of two carrier signals (sin $\omega_n$ and cos $\omega_n$) generated from the quadrature mix 432 are adjusted based on the phase error feedback from the FIR filters 434.

It is noted that, in the receiving system 400, the down sample rate converters 426 and 436, the buffers 428 and 438, and the timing recovery 429 are optional devices. That is, in other embodiments of the present invention, the receiving system 300 can function well without these optional devices.

Figure 5:
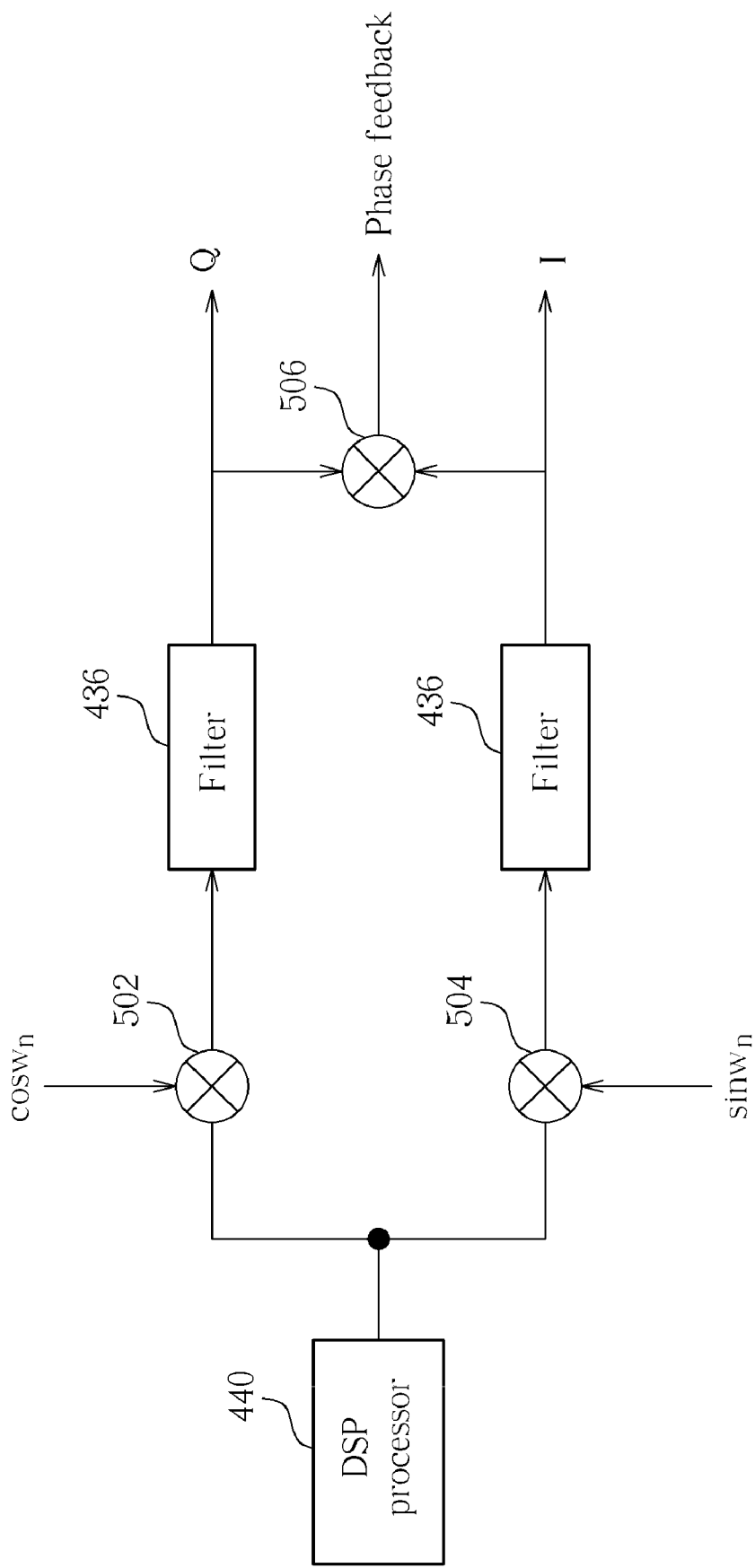
FIG. 5 illustrates a hardware configuration of the FIR filters shown in FIG. 4 and related circuits.

Please refer to FIG. 5. FIG. 5 illustrates a hardware configuration of the filters 436 and related circuits. As shown in FIG. 5, the processed audio signal generated from the DSP processor 440 is respectively multiplied by the carrier signals sin $\omega_n$ and the cos $\omega_n$ generated from the quadrature mix 432 by the multipliers 502 and 504. Then the filters 436 generate two filtered audio signals according to two multiplied signal from the multiplier 502 and 504. Then the multiplier 506 multiplies the two filtered audio signals to generate the phase error feedback. The hardware configuration shown in FIG. 5 can accelerate the AM demodulation or another FM demodulation in MTS system.

Briefly summarized, when the receiving system is designed for both the Zweikanalton system and the MTS system, the receiving system required two demodulation units for respectively demodulate two carriers concurrently in the Zweikanalton system. However, when the receiving system is set to be used in the MTS system, only one demodulation unit is required to perform two level demodulations (FM/FM or FM/AM) on the audio signal, and another demodulation unit is unused. In the present invention, the FM demodulation is processed by the first demodulation unit, and the AM demodulation (or another FM demodulation) is processed by the second demodulation unit (original unused demodulation unit). Therefore, the original unused second demodulation unit is now used to perform AM demodulation, a loading of a firmware in the receiving system is lower, and the audio signal demodulation is accelerated.

Those skilled in the art will readily observe that numerous modifications and alterations of the device and method may be made while retaining the teachings of the invention.

What is claimed is:

1. A receiving system for audio processing, comprising:
    a first demodulation unit, for receiving an audio signal and generating a first demodulated audio signal; and
    a second demodulation unit, for selectively receiving the audio signal or the first demodulated audio signal according to a setting of a television audio system which the receiving system is applied, and generating a second demodulated audio signal.

2. The receiving system of claim 1, wherein when the receiving system is set to be utilized in a Zweikanalton system or a Near Instantaneous Companded Audio Multiplex (NICAM) system, the second demodulation unit receives the audio signal and generates the second demodulated audio signal.

3. The receiving system of claim 1, wherein when the receiving system is set to be utilized in a Multichannel Television Sound (MTS) system, the second demodulation unit receives the first demodulated audio signal and generates the second demodulated audio signal.

4. The receiving system of claim 1, further comprising:
    a base-band processing unit, for synchronizing the first and second demodulated audio signal.

5. The receiving system of claim 1, further comprising:
    a digital signal processing (DSP) unit, for synchronizing the first and second demodulated audio signal.

6. The receiving system of claim 5, wherein the DSP processor further take some demodulation processes of the first demodulation unit or the second demodulation unit.

7. The receiving system of claim 1, wherein the second demodulation unit comprises:
    a quadrature mix, for generating two carrier signals; and
    a multipler, coupled to the quadrature mix, for performing filtering and generating phase error feedback according to the first demodulated audio signal;
    wherein the quadrature mix adjusts phases of the two carrier signals according to the phase error feedback.

8. A receiving method for audio processing, comprising:
    receiving an audio signal and generating a first demodulated audio signal; and
    selectively receiving the audio signal or the first demodulated audio signal according to a setting of a television audio system, and generating a second demodulated audio signal.

9. The receiving method of claim 8, wherein when the receiving system is set to be utilized in a Zweikanalton system or a Near Instantaneous Companded Audio Multiplex (NICAM) system, the step of selectively receiving the audio signal or the first demodulated audio signal according to a setting of a television audio system comprises:
    receiving the audio signal and generating the second demodulated audio signal.

10. The receiving method of claim 8, wherein when the receiving system is set to be utilized in a Multichannel Television Sound (MTS) system, the step of selectively receiving the audio signal or the first demodulated audio signal according to a setting of a television audio system comprises:
    receiving the first demodulated audio signal and generating the second demodulated audio signal.

11. The receiving method of claim 8, further comprising:
    synchronizing the first demodulated audio signal and the second demodulated audio signal.

12. The receiving method of claim 8, wherein the step of selectively receiving the audio signal or the first demodulated audio signal according to a setting of a television audio system and generating the second demodulated audio signal comprises:
    receiving the first demodulated audio signal and generating the second demodulated audio signal; and the step of receiving the first demodulated audio signal and generating the second demodulated audio signal comprises:
    generating two carrier signals; and
    generating phase error feedback according to the first demodulated audio signal;
    adjusting phases of the two carrier signals according to the phase error feedback.

* * * * *